United States Patent [19]
Hughes

[11] Patent Number: 5,883,191
[45] Date of Patent: Mar. 16, 1999

[54] ACRYLONITRILE/STYRENE/ACRYLIC POLYMERIC MATERIALS AND METHODS FOR MAKING SAME

[75] Inventor: Roderick E. Hughes, Newport Beach, Calif.

[73] Assignee: Hughes Processing, Inc., Costa Mesa, Calif.

[21] Appl. No.: 937,104

[22] Filed: Sep. 24, 1997

[51] Int. Cl.$^6$ .............. C08L 33/04; C08L 51/00
[52] U.S. Cl. ............. 525/85; 525/71; 525/78; 525/80; 525/902
[58] Field of Search .................. 525/71, 78, 80, 525/85, 902

[56] References Cited

U.S. PATENT DOCUMENTS

| | | | |
|---|---|---|---|
| 3,408,424 | 10/1968 | Barkhuff | 525/297 |
| 3,444,269 | 5/1969 | Beer | 525/71 |
| 3,632,675 | 1/1972 | Foglesong et al. | 525/70 |
| 3,808,180 | 4/1974 | Owens | 525/291 |
| 3,943,103 | 3/1976 | Borden et al. | 525/305 |
| 3,944,631 | 3/1976 | Yu et al. | 525/305 |
| 4,239,673 | 12/1980 | Lee, Jr. | 525/141 |
| 4,424,303 | 1/1984 | Liu | 525/67 |
| 4,517,339 | 5/1985 | Aliberto et al. | 525/85 |
| 4,663,390 | 5/1987 | Dean | 525/73 |
| 4,731,414 | 3/1988 | Ting | 525/71 |
| 4,831,079 | 5/1989 | Ting | 525/71 |
| 5,122,571 | 6/1992 | Westeppe et al. | 525/66 |
| 5,290,859 | 3/1994 | Niessner et al. | 525/67 |
| 5,447,989 | 9/1995 | Mylonakis et al. | 525/67 |

*Primary Examiner*—Mark L. Warzel
*Attorney, Agent, or Firm*—Frank J. Uxa

[57] ABSTRACT

Compositions which have substantial weatherability and impact resistance comprise a substantially uniform physical blend of an uncross-linked acrylonitrile/styrene copolymer and a cross-linked alkyl acrylate/graft (meth)acrylate copolymer. Methods for making such compositions include forming a substantially uniform physical blend of such copolymers. The compositions preferably are substantially free of cross-linked acrylonitrile/styrene copolymer.

21 Claims, No Drawings

ACRYLONITRILE/STYRENE/ACRYLIC POLYMERIC MATERIALS AND METHODS FOR MAKING SAME

BACKGROUND OF THE INVENTION

The present invention relates to compositions comprising acrylonitrile/styrene/acrylic ("ASA") polymeric materials and methods for making such compositions. More particularly, the present invention relates to compositions comprising ASA polymeric materials which include physical mixtures of polymers and to methods for making such physical mixture-containing compositions.

Acrylic/styrene/acrylonitrile polymeric resins are known and have been used in various applications which taken advantage of the weatherability of such resins. As used herein, the term "weatherability" refers to the ability or property of a material to effectively withstand the conditions of an out-of-doors environment over a long period of time, for example, at least five years and preferably at least seven years, with substantially no degradation or decomposition. In general, such resins have been terpolymers of an acrylate monomer, styrene monomer and acrylonitrile monomer. See, for example, Yu et al U.S. Pat. No. 3,944,631, Ting U.S. Pat. No. 4,831,079 and Ting U.S. Pat. No. 4,731,414.

In the past, such resins compositions have been produced in accordance with sequential polymerization processes in which one or more monomers are polymerized followed by one or more further polymerizations of an additional monomer or monomers in the presence of the product of the first polymerization. Such sequential polymerization processes have certain drawbacks. For example, it is relatively difficult to consistently control the various polymerization steps involved. This can lead to the economically wasteful production of materials which do not meet product specifications. In addition, such sequential polymerization processes often occur in large scale, expensive and relatively complex equipment.

It would be advantageous to provide compositions including ASA polymeric materials which have substantially uniform and controlled compositions, e.g., which consistently meet product specifications, and can be produced in a cost effective and straightforward manner.

SUMMARY OF THE INVENTION

New acrylonitrile/styrene/acrylic polymeric material-containing compositions and methods for making such compositions have been discovered. The present invention is based on the discovery that certain acrylonitrile/styrene copolymers and certain acrylic-containing copolymers can be physically blended, for example, using methodologies which can be cost effectively practiced to provide ASA polymeric material-containing compositions which have controlled and substantially uniform compositions or make-ups. Moreover, the present compositions have the desirable properties, for example, weatherability, strength, flexibility and the like, of the resinous materials made by the sequential polymerization processes noted above.

In one broad aspect of the present invention, compositions are provided which comprise a substantially uniform blend of an uncrossed-linked acrylonitrile/styrene copolymer, for example, a linear uncross-linked acrylonitrile/styrene copolymer, and a cross-linked alkyl acrylate/graft (meth) acrylate copolymer.

In one particularly useful embodiment of the present invention, weatherable compositions are provided which comprise a substantially uniform blend including at least about 30% by weight, based on the total weight by composition, of an uncrossed-linked acrylonitrile/styrene copolymer and at least about 5% by weight, based on the total weight of the composition of a cross-linked alkyl acrylate/graft (meth)acrylate copolymer.

Without wishing to limit the invention to any particular theory of operation, it is believed that the uncross-linked (e.g., linear) acrylonitrile/styrene copolymer is substantially miscible or compatible with the (meth)acrylate of the cross-linked alkyl acrylate/graft (meth)acrylate copolymer at effective blending conditions. Thus, during the blending operation, the two components can be combined into a substantially uniform mixture even though the cross-linked alkyl acrylate may not be miscible or compatible with the uncross-linked acrylonitrile/styrene copolymer. In other words, the (meth)acrylate appears to mitigate against the incompatibility between the uncross-linked acrylonitrile/styrene copolymer and the cross-linked alkyl acrylate. The cross-linked alkyl acrylate/graft (meth)acrylate copolymer provides the acrylic portion of the present ASA polymeric material-containing compositions and, in addition, facilitates the formation of the present substantially uniform, preferably physical, blends of copolymers. Moreover, the cross-linked alkyl acrylate/graft (meth)acrylate copolymer is effective to provide beneficial impact resistance to the present compositions.

In order to avoid component incompatibility, the present compositions preferably are substantially free of cross-linked acrylonitrile/styrene copolymers.

As used herein, the term "physical blend" refers to a composition in which the constituent components are combined or mixed with substantially no chemical bonding, in particular with substantially no covalent chemical bonding between the constituents. The physical blends of uncross-linked acrylonitrile/styrene copolymers and cross-linked alkyl acrylate/graft (meth)acrylate copolymers in accordance with the present invention are distinguished from the acrylic-styrene/acrylonitrile terpolymers produced by the sequential polymerization processes noted above.

The uncross linked acrylonitrile/styrene copolymers preferably are present in amounts in a range of about 30% to about 95% by weight of the compositions. The cross-linked alkyl acrylate/graft (meth)acrylate copolymers preferably are present in amounts in a range of about 5% to about 70% by weight of the compositions.

More preferably, the present compositions further comprise effective amounts of one or more of the following antioxidants: lubricants, ultraviolet light stabilizers, thermal stabilizers, pigments, such as titanium dioxide, and the like additives. Precise amounts of such additives can be included in the mixture from which the substantially uniform physical blend of copolymers is made.

In another broad aspect of the present invention, methods for forming weatherable compositions are provided. Such methods comprise providing an uncross-linked acrylonitrile/styrene copolymer; providing a cross-linked alkyl acrylate/graft (meth)acrylate polymer; and forming a substantially uniform physical blend of the uncross-linked acrylonitrile/styrene copolymer and the cross-linked alkyl acrylate/graft (meth)acrylate polymer. The physical blend thus formed preferably is substantially free of cross-linked acrylonitrile/styrene copolymer.

The present forming step preferably includes subjecting a mixture of the uncross-linked acrylonitrile/styrene copolymer and the cross-linked alkyl acrylate/graft (meth)acrylate polymer to conditions effective to produce a substantially uniform, flowable or extrudable composition. Such conditions can include, for example, elevated temperature conditions, elevated pressure conditions, shear or mixing conditions and combinations thereof. The forming step more preferably further includes extruding the substantially uniform composition, in particular, extruding the substantially uniform, flowable or extrudable composition, into useful shapes and configurations.

These and other aspects of the present invention are apparent in the following detailed description of the invention.

DETAILED DESCRIPTION

The present compositions can be used to form weatherable, impact resistant articles. For example, the present compositions, alone or in combination, e.g., as a composite, laminate and the like, with one or more other materials can be used to produce articles, such as window coverings, house sidings, and other articles which are resistant to the effects of outdoor weather on a long term basis and, therefore, can be employed out-of-doors. The present compositions can be molded, extruded and/or otherwise formed into shapes and configurations useful in producing such finished product articles. Such finished product articles can include only the compositions of the present invention or can be composites or other combinations of the present compositions with other materials, such as wood, glass, additional polymeric materials, other fillers and the like.

In one aspect of the present invention, compositions are provided which comprise substantially uniform blends of uncross-linked acrylonitrile/styrene copolymers and cross-linked alkyl acrylate/graft (meth)acrylate copolymers. The composition, in one embodiment, includes at least about 30% by weight, based on the total weight of the composition, of an uncross-linked acrylonitrile/styrene copolymer and at least about 5% by weight, based on the total weight of the composition, of the cross-linked alkyl acrylate/graft (meth)acrylate copolymer. More preferably, the acrylonitrile/styrene copolymer is present in an amount in the range of about 30% to about 95% by weight, based on the total weight of the composition, and the cross-linked alkyl acrylate/graft (meth)acrylate copolymer is present in an amount in the range of about 5% to about 70% by weight, based on the total weight of the composition.

The uncross-linked acrylonitrile/styrene copolymers useful in the present invention preferably have an acrylonitrile content in the range of about 20% to about 40% by weight, and a styrene content in the range of about 60% to about 80% by weight.

The uncross-linked acrylonitrile/styrene copolymer component can be produced by polymerization, e.g., emulsion or suspension polymerization, of a mixture of acrylonitrile and styrene. See, for example, Yu et al U.S. Pat. No. 3,944,631 the disclosure of which is hereby incorporated in its entirety by reference herein.

Emulsion polymerization is carried out by adding the acrylonitrile-styrene charge to an aqueous emulsion.

If desired, minor amounts, e.g., below about 20% by weight, of optional monomers can be included. Examples of such optional monomers are t-butyl styrene, p-chlorostyrene, alpha-methyl styrene, methyl methacrylate, alkyl acrylate, vinylidene chloride, ethylene, propylene, isobutylene and/or other ethylenically unsaturated compounds copolymerizable with acrylonitrile and styrene. Preferably, the only significant or substantial monomers used are acrylonitrile and styrene.

Emulsifiers, initiators and chain transfer agents can be used in effective amounts to provide the desired result or benefit during the acrylonitrile-styrene polymerization.

The emulsifier which may be used is at least one of the following conventional types: an anionic emulsifier, e.g., the $C_2$–$C_{22}$ carboxylic acids, the sulfates or, sulfonates, of $C_6$–$C_{22}$ alcohols or alkyl phenols; a non-ionic emulsifier, e.g., the addition products of alkylene oxides to fatty acids, amines or amides; a combination of the foregoing anionic and non-ionic emulsifiers; or the cationic emulsifiers, e.g., a quaternary ammonium containing compound. The amount of emulsifier preferably is present in an amount in a range of about 0.5% to about 5% by weight in the emulsion.

An initiator preferably is present in the emulsion in an amount in a range of about 0.005% to about 2% by weight of the monomer charge. Suitable for use are water-soluble peroxidic compounds, e.g., hydrogen peroxide and alkali metal and ammonium persulfates, oil soluble organic peroxides and azo compounds, e.g., benzoyl peroxide, azobisisobutyronitrile and the like, used singly or in combination. Redox catalysts, e.g., mixtures of peroxidic catalysts with reducing agents, such as hydazine, alkali metal bisulfites, thiosulfates, and hydrosulfites, and soluble oxidizable sulfoxyl compounds can also be used.

A chain transfer agent such as an alkyl mercaptan, e.g., t-dodecyl mercaptan, toluene, xylene, chloroform, halogenated hydrocarbons and the like may also be used.

A buffer to keep the pH at 7.0 or higher is preferably included in the emulsion.

If suspension polymerization is chosen, the suspending agent can be methyl cellulose, hydroxyethyl cellulose, hydroxypropyl cellulose, hydroxypropyl methyl cellulose, carboxymethyl cellulose, talc, clay, polyvinyl alcohol, gelatine and the like.

Other additives can be used in forming the linear acrylonitrile/styrene copolymers to confer desired properties upon the final product. Included are conventional light, thermal and ultraviolet light stabilizers, antioxidants, dyes, pigments, mineral additives and fillers and reinforcing agents, and the like.

Uncross-linked or linear acrylonitrile/styrene copolymers are commercially available. Such commercially available copolymers are useful in the present invention and, in fact, are preferred. Using such commercially available copolymers reduces the capital investment needed to commercially practice the invention. In addition, purchasing such acrylonitrile/styrene copolymers, which can be routinely analyzed using conventional techniques, eliminates the economic risk of making copolymers which do not have the desired properties. Examples of useful commercially available uncross-linked acrylonitrile/styrene copolymers include materials sold under the trademark Blendex 570 and Tyril 860 sold by GE Specialty Chemicals and Dow Chemical, respectively. A particularly useful commercially available uncross-linked, linear acrylonitrile/styrene copolymer is that sold by Bayer under the trademark Lustran, e.g., Lustran 31.

The cross-linked alkyl acrylate/graft (meth)acrylate copolymers included in the compositions of the present invention preferably are multistage elastomers comprised of a cross-linked alkyl acrylate which is graft linked to a poly (meth)acrylate, preferably polymethyl (meth)acrylate. The cross-linked alkyl acrylate/graft (meth)acrylate copolymer includes an alkyl acrylate portion present in a range of about 50% to about 95% by weight of the copolymer, and a (meth)acrylate portion present in a range of about 5% to about 50% by weight of the copolymer.

The cross-linked alkyl acrylate portion of the cross-linked alkyl acrylate/graft (meth) acrylate preferably is a copolymer containing a major proportion, that is at least 50% by weight, of alkyl and/or aralkyl acrylates, with the inclusion of about 0.05% to about 50% by weight of a polyunsaturated cross-linking comonomer and about 0% to about 10% by weight of a hydrophilic comonomer, ordinarily polymerized from an emulsion or suspension. The alkyl esters of acrylic acid have alkyl groups of 1 to about 15 carbon atoms, preferably 1 to about 8 carbon atoms. Longer chain alkyl groups may be used. Other acrylic monomers, up to about 50 weight percent, less the other inclusions, can also be used, such as aralkyl esters of acrylic acid wherein the cyclic portion contains 5, 6 or 7 carbon atoms with or without an additional alkyl bridge, and the alkyl portion of the aralkyl group containing up to about 15 carbon atoms may also be used. Substituted acrylates or methacrylates including alkylthioalkyl acrylates such as ethyithioethyl acrylate and the like, alkoxyalkyl acrylates, such as methoxyethyl acrylate and the like, can also be used. Interpolymers with these acrylates can be based on up to about 40% by weight of one or more other addition polymerizable monomers such as styrene, alpha-methyl styrene, vinyl ethers, amides, and esters, vinyl and vinylidene halides and the like.

The (meth)acrylate portion of the cross-linked alkyl acrylate/graft (meth)acrylate copolymers may be characterized as having the majority (e.g., 50% to 100%) of alkyl (meth)acrylate units. The alkyl (meth)acrylate polymers may contain minor amounts (0% to about 40%) of non-acrylic units to provide well-known balances of physical characteristics. These polymers preferably have a heat distortion temperature greater than about 68° F., more preferably greater than about 120° F. The (meth)acrylate portion may include copolymers of about 50% to 100% alkyl methacrylate, wherein the alkyl group contains 1 to 4, preferably 1, carbon atoms, and 0% to about 50% of one or more other acrylic monomers such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters and other substituents, and 0% to about 40% of other unsaturated monomers including vinyl esters, vinyl ethers, vinyl amides, vinyl ketones, vinyl halides, vinylidene halides, olefins and the like.

Among the hydrophilic monomers which may be included in the cross-linked alkyl acrylate/graft (meth) acrylate copolymers can be, by way of example only, hydroxy-substituted alkyl and aryl acrylates and methacrylates, amino-substituted alkyl and aryl acrylates and methacrylates, polyether acrylates and methacrylates, alkyl-phosphato-alkyl acrylates and methacrylates, alkyl-phosphonoalkyl acrylates and methacrylates, acrylic acid, methacrylic acid, maleic acid, maleic anhydride, N-vinyl pyrrolidone, alkyl and substituted alkyl amides of acrylic acid, and methacrylic acid, acrylamide, methacrylamide and the like.

Graft-linking monomers useful in producing the present cross-linked alkyl acrylate/graft (meth)acrylic copolymers, by way of example only, include allyl group containing compounds, such as allyl esters of ethylenically unsaturated acids. Most preferred are allyl acrylate, allyl methacrylate, diallyl maleate, diallyl fumarate, allyl acid itaconate and the like.

The cross-linked alkyl acrylate/graft (meth)acrylate copolymers preferably include cross-linked n-butyl acrylate-containing polymers and/or methyl methacrylate-containing polymers. In a particularly useful embodiment, the cross-linked alkyl acrylate/graft (meth)acrylate copolymer comprises a two stage polymer having a cross-linked n-butyl acrylate-based rubbery core and a second stage polymerized from methylmethacrylate alone or in combination with styrene.

Especially preferred cross-linked alkyl acrylate/graft (meth)acrylate copolymers include the core-shell polymers of the type available from Rohm & Haas Co. under the trademark Acryloid® KM330 and KM334. These components contain units derived from n-butyl acrylate, alone or in combination with a vinyl aromatic compound. Components of this type are disclosed in Owens U.S. Pat. No. 3,808,180, the disclosure of which is hereby incorporated in its entirety herein by reference.

Optionally, the compositions of this invention may further contain one or more reinforcing agents. Typical reinforcing agents useful for the invention include but are not limited to, glass fiber, mica or both. Compositions of this invention may also include effective amounts of conventional pigments, processing aides, lubricants, antioxidants and stabilizers such as ultraviolet light and thermal stabilizers, and the like.

The present methods for forming a weatherable composition comprise providing an uncross-linked acrylonitrile/styrene copolymer; providing a cross-linked alkyl acrylate/graft (meth)acrylate copolymer; and forming a substantially uniform physical blend of these two copolymers. This physical blend preferably is substantially free of cross-linked acrylonitrile/styrene copolymer.

The present forming step preferably includes subjecting a mixture of uncross-linked acrylonitrile/styrene copolymer and alkyl acrylate/graft (meth)acrylate copolymer to conditions effective to produce a substantially uniform, flowable or extrudable composition. In one embodiment, the forming step includes extruding the substantially uniform physical composition, in particular, the substantially uniform flowable or extrudable composition.

Blending of the formulation of the present invention can be achieved by any of the well-known polymer blending techniques, such as two-roll or Banbury mixing, single or multiple screw extrusion, or any other method which applies sufficient heat (temperature) and/or pressure and/or shear (mixing) to the ingredients to obtain an uniform blend. Typical temperatures are in a range of about 300° F. or about 325° F. to about 450° F. or about 475° F., while typical elevated pressures are in a range of about 750 psi or about 1000 psi to about 2000 psi or more. At such temperatures and/or pressures, the shear or mixing force typically generated in the above-noted mixing or extrusion systems is sufficient to obtain the desired, substantially uniform blend of copolymers.

The substantially uniform blend formed preferably includes at least about 30% by weight of the uncross-linked acrylonitrile/styrene copolymer at least about 5% by weight of the cross-linked alkyl acrylate/graft (meth)acrylate copolymer. More preferably, the uncross lined acrylonitrile/styrene copolymer is present in an amount in a range of about 30% to about 95% by weight based on the total weight of the composition and the cross-linked alkyl acrylate/graft (meth)acrylate copolymer is present in an amount in a range of about 5% to about 70% by weight based on the total weight of the composition. It is preferred that, during the forming step, substantially no polymerization occurs.

The following non-limiting examples illustrate certain advantages of the present invention.

EXAMPLES 1 AND 2

The following formulations are prepared by combining the listed ingredients:

|  | Example 1 wt % | Example 2 wt % |
|---|---|---|
| Uncross-linked, linear acrylonitrile/ styrene copolymers[1] | 75.88 | 66.88 |
| Cross-linked n-butyl acrylate/ graft methyl (meth)acrylate copolymer[2] | 22.38 | 31.59 |
| Lubricant[3] | 1.15 | 1.00 |
| Stabilizer[4] | 0.15 | 0.13 |
| Light stabilizer[4] | 0.30 | 0.27 |
| Antioxidant[4] | 0.15 | 0.13 |

[1]Sold by Bayer under the trademark Lustran 31 (contains about 23% by weight of acrylonitrile).
[2]Sold by Rohm & Haas Co. under the trademark Acryloid KM334, n-butyl acrylate/butylene glycol diacrylate/methyl methacrylate/alkylacrylate
[3]Sold by Struktol Corporation under the trademark TR-251, metal stearate/ amide composition effective as lubricant.
[4]Well known, commercially available component.

Each of these formulations is thoroughly mixed at elevated temperatures of about 400° F.–450° F. (which is the melt temperature range of these formulations) to form a substantially uniform, extrudable composition. These compositions have the following properties:

|  | EXAMPLE 1 | EXAMPLE 2 |
|---|---|---|
| Melt Flo, ASTM D1238, Condition I, gm/10 min. | 3.70 | 2.10 |
| IZOD, ASTM D256, 23 C, ft. lbs./in. notch | 3.50 | 5.60 |

These results indicate that each of these compositions is indeed flowable or extrudable and has substantial impact resistance.

EXAMPLES 3 AND 4

Each of the compositions that are produced in Example 1 and 2 is successfully formed into pellets using a Cincinnati Milacron Model CM-80 conical twin screw extruder and a Beringer Water Ring Pelletizer. In each following conditions are employed.

Barrel Zone 1 325° F.
Barrel Zone 2 325° F.
Barrel Zone 3 365° F.
Barrel Zone 4 365° F.
Adaptor Zone 1 365° F.
Adaptor Zone 2 365° F.
Screenchanger
 Zone 3 365° F.
Die Zone 4 375° F.
Die Zone 5 375° F.
Screw Oil 350° F.
Motor, RPM 2000
Motor Load, amps 110

EXAMPLES 5 AND 6

A sample of the pellets produced in each of Examples 3 and 4 is successfully extruded as a cap material over a rigid acrylonitrile/butadiene/styrene (ABS) foam material using a 1.75 inch, 24:1 L/D Akron extruder. The following conditions are used:
Barrel Zone 1 310
Barrel Zone 2 330
Barrel Zone 3 350
Die Zone 1 360
Die Zone 2 360
Capping Head 360
Screw, RPM 24
Motor Load, amps 18

The pellets and capped ABS articles produced in the Examples are found to have sufficient weatherability to be used out-of-doors on a long term basis. In addition, these pellets and capped ABS articles have satisfactory impact resistance. These pellets and capped ABS articles, in accordance with the present invention, provide performance at least comparable to pellets and capped ABS articles made using an acrylic/styrene/acrylonitrile polymeric material produced by sequential polymerization processing, as described herein. Such pellets and capped articles are obtained, in accordance with the present invention, cost effectively and without incurring the capital expenditures and process complexity involved with such sequential polymerization processing.

While this invention has been described with respect to various specific examples and embodiments, it is to be understood that the invention is not limited thereto and that it can be variously practiced within the scope of the following claims.

What is claimed is:

1. A weatherable composition comprising a physical blend having a substantially uniform make-up and including at least about 30% by weight, based on the total weight of the composition, of an uncross-linked acrylonitrile/styrene copolymer and at least about 5% by weight, based on the total weight of the composition, of a cross-linked alkyl acrylate/graft (meth)acrylate copolymer, said composition being substantially free of cross-linked acrylonitrile/styrene copolymer.

2. The weatherable composition of claim 1 wherein said uncross-linked acrylonitrile/styrene copolymer is present in an amount in a range of about 30% to about 95% by weight, based on the total weight of the composition, and said cross-linked alkyl acrylate/graft (meth)acrylate copolymer is present in an amount in a range of about 5% to about 70% by weight, based on the total weight of the composition.

3. The-weatherable composition of claim 1 wherein said uncross-linked acrylonitrile/styrene copolymer has an acrylonitrile content in a range of about 20% to about 40% by weight, and a styrene content in a range of about 60% to about 80% by weight.

4. The weatherable composition of claim 1 wherein said cross-linked alkyl acrylate/graft (meth)acrylate copolymer includes cross-linked n-butyl acrylate-containing polymer.

5. The weatherable composition of claim 4 wherein said cross-linked alkyl acrylate/graft (meth)acrylate copolymer includes methyl methacrylate-containing polymer.

6. The weatherable composition of claim 1 wherein said cross-linked alkyl acrylate/graft (meth)acrylate copolymer has an alkyl acrylate content in the range of about 50% to about 95% by weight and a (meth)acrylate content in the range of about 5% to about 50% by weight.

7. The weatherable composition of claim 1 which further comprises an effective amount of a lubricant.

8. A composition comprising a physical blend of an uncross-linked acrylonitrile/styrene copolymer and a cross-linked alkyl acrylate/graft (meth)acrylate copolymer, said blend having a substantially uniform make-up, said composition being weatherable and substantially free of cross-linked acrylonitrile/styrene copolymer.

9. The composition of claim 8 wherein said uncross-linked acrylonitrile/styrene copolymer is present in an amount in a range of about 30% to about 95% by weight based on the total weight of the composition and said cross-linked alkyl acrylate/graft (meth)acrylate copolymer is present in an amount in a range of about 5% to about 70% by weight based on the total weight of the composition.

10. The composition of claim 8 wherein said uncross-linked acrylonitrile/styrene copolymer has an acrylonitrile content in a range of about 20% to about 40% by weight, and a styrene content in a range of about 60% to about 806 by weight, and said cross-linked alkyl acrylate/graft (meth) acrylate has an alkyl acrylate content in the range of about 50% to about 95% by weight and a (meth)acrylate content in the range of about 5% to about 50% by weight.

11. The composition of claim 8 wherein said cross-linked alkyl acrylate/graft (meth)acrylate includes cross-linked n-butyl acrylate-containing polymer, and methyl methacrylate-containing polymer.

12. A method for forming a weatherable resin composition comprising:

providing an uncross-linked acrylonitrile/styrene copolymer;

providing a cross-linked alkyl acrylate/graft (meth) acrylate copolymer; and forming a physical blend of said uncross-linked acrylonitrile/styrene copolymer and said cross-linked alkyl acrylate/graft (meth)acrylate copolymer, said physical blend having a substantially uniform make-up and being substantially free of cross-linked acrylonitrile/styrene copolymer.

13. The method of claim 12 wherein said forming step includes subjecting a mixture of said uncross-linked acrylonitrile/styrene copolymer and said cross-linked alkyl acrylate/graft (meth)acrylate copolymer to conditions effective to produce a flowable or extrudable composition having a substantially uniform make-up.

14. The method of claim 12 wherein said forming step includes extruding said physical blend.

15. The method of claim 12 wherein said physical blend includes at least about 30% by weight of said uncross-linked acrylonitrile/styrene copolymer and at least about 5% by weight of said cross-linked alkyl acrylate/graft (meth) acrylate copolymer.

16. The method of claim 12 wherein said uncross-linked acrylonitrile/styrene copolymer is present in an amount in a range of about 30% to about 95% by weight based on the total weight of the composition and said cross-linked alkyl acrylate/graft (meth)acrylate copolymer is present in an amount in a range of about 5% to about 70% by weight based on the total weight of the composition.

17. The method of claim 12 wherein said uncross-linked acrylonitrile/styrene copolymer has a styrene content in a range of about 60% to about 80% by weight, and an acrylonitrile content in a range of about 20% to about 40% by weight.

18. The method of claim 12 wherein said cross-linked alkyl acrylate/graft (meth)acrylate includes cross-linked n-butyl acrylate-containing polymer, and methyl methacrylate-containing polymer.

19. The method of claim 12 wherein said cross-linked alkyl acrylate/graft (meth)acrylate has an alkyl acrylate content in the range of about 50% to about 95% by weight and a (meth)acrylate content in the range of about 5% to about 50% by weight.

20. The method of claim 12 wherein substantially no polymerization occurs during said forming step.

21. The method of claim 13 wherein said conditions are selected from the group consisting of elevated temperature conditions, elevated pressure conditions, mixing conditions and combinations thereof.

* * * * *

UNITED STATES PATENT AND TRADEMARK OFFICE
CERTIFICATE OF CORRECTION

PATENT NO. : 5,883,191
DATED : March 16, 1999
INVENTOR(S) : Hughes

It is certified that error appears in the above-identified patent and that said Letters Patent is hereby corrected as shown below:

Column 9, line 9, delete "806" and insert --80%--.

Signed and Sealed this

Tenth Day of April, 2001

Attest:

NICHOLAS P. GODICI

Attesting Officer     Acting Director of the United States Patent and Trademark Office